US006947994B1

(12) United States Patent
Kraslavsky

(10) Patent No.: US 6,947,994 B1
(45) Date of Patent: *Sep. 20, 2005

(54) NEGOTIATING AN EXCHANGE OF IMAGE PROCESSING FUNCTIONALITY

(75) Inventor: Andrew J. Kraslavsky, Rancho Santa Margarita, CA (US)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/288,967

(22) Filed: Apr. 9, 1999

(51) Int. Cl.[7] .............................................. G06F 15/16
(52) U.S. Cl. ..................................................... 709/230
(58) Field of Search ................................ 358/296, 408, 358/1.15; 355/40; 382/245, 162, 164; 709/217, 709/225, 230; 700/83; 710/36; 434/365

(56) References Cited

U.S. PATENT DOCUMENTS

| | | | |
|---|---|---|---|
| 5,214,779 A | 5/1993 | Barker et al. ................ 395/600 |
| 5,291,585 A | 3/1994 | Sato et al. .................... 395/500 |
| 5,386,512 A | 1/1995 | Crisman et al. ............. 709/228 |
| 5,420,696 A * | 5/1995 | Wegeng et al. .............. 358/408 |
| 5,600,445 A * | 2/1997 | Omi ............................ 358/296 |
| 5,604,860 A | 2/1997 | McLaughlin et al. ........ 395/326 |
| 5,689,642 A | 11/1997 | Harkins et al. ......... 395/200.04 |
| 5,694,549 A | 12/1997 | Carlin et al. .............. 395/200.2 |
| 5,717,439 A | 2/1998 | Levine et al. ................ 345/353 |
| 5,726,883 A | 3/1998 | Levine et al. ................ 364/188 |
| 5,771,388 A | 6/1998 | Mondrik et al. ............. 395/735 |
| 5,805,777 A | 9/1998 | Kuchta ......................... 395/112 |
| 5,875,034 A * | 2/1999 | Shintani et al. .............. 358/296 |
| 6,000,946 A * | 12/1999 | Snyders et al. .............. 434/365 |

6,088,476 A * 7/2000 Shimamura .................. 382/164

(Continued)

FOREIGN PATENT DOCUMENTS

| | | |
|---|---|---|
| EP | 652668 | 5/1995 |
| EP | 872991 | 10/1998 |
| EP | 883270 | 12/1998 |

OTHER PUBLICATIONS

Parsons et al, Negotiation through argumentation-a preliminary report, 1996, Proceedings of the International Conference on Multi-Agent Systems, pp. 267-274.*

John Measows, An Introduction to the JetSend Protocol, Jan. 2000, Embedded Systems.*

"HP JetSend™ Communications Technology, Section I: Architectural Overview; Section II: Protocol References; and Section III: E-Material Specification", Version 1.0, Hewlett-Packard Company, 1997.

Primary Examiner—John Follansbee
Assistant Examiner—Jungwon Chang
(74) Attorney, Agent, or Firm—Fitzpatrick, Cella, Harper & Scinto

(57) ABSTRACT

Negotiation between first and second devices having a bi-directional communication link, so as to negotiate a low-cost image processing sequence that effects a transfer of image data from a first device to the second device. According to the negotiation, the devices determine whether functionality present in one device can be executed more efficiently in the other device, so as to increase image transfer efficiency and maintain good image quality. If functionality present in one device is more efficiently executed in the other device so as to achieve an overall increase in efficiency in the transfer of image data, then the functionality is transferred over the bi-directional communication link and the transfer of image data proceeds by incorporating the transferred functionality.

23 Claims, 10 Drawing Sheets

U.S. PATENT DOCUMENTS

| | | | | |
|---|---|---|---|---|
| 6,167,442 | A * | 12/2000 | Sutherland et al. | 709/217 |
| 6,202,096 | B1 * | 3/2001 | Williams et al. | 709/230 |
| 6,297,872 | B1 * | 10/2001 | Imamura et al. | 355/40 |
| 6,298,164 | B1 * | 10/2001 | Suzuki et al. | 382/245 |
| 6,449,053 | B2 * | 9/2002 | Bando | 358/1.15 |
| 6,502,000 | B1 * | 12/2002 | Arnold et al. | 700/83 |
| 6,546,129 | B1 * | 4/2003 | Ohta et al. | 382/162 |
| 6,651,118 | B2 * | 11/2003 | Carau et al. | 710/36 |

* cited by examiner

NEGOTIATING AN EXCHANGE OF IMAGE PROCESSING FUNCTIONALITY

BACKGROUND OF THE INVENTION

1. Field of the Invention

The present invention relates to transmission of image data between two image processing devices over a bi-directional communication interface, such as a local area network. More specifically, the invention involves negotiation between two devices such as an image output device and an image input device, so as to transfer image data between the devices, and so as to negotiate whether exportable image processing functionality on one device should be exported to the other device so as to increase overall image transfer efficiency.

2. Description of the Related Art

In local area networks and other environments providing bi-directional communication between connected devices, it is becoming increasingly common for such devices to communicate directly with each other so as to intelligently negotiate information exchange ordinarily without the need of a separate computer providing oversight. Once such negotiation protocol is JetSend™, which is a device-to-device communications protocol for local and wide area networks that allows network devices to intelligently negotiate information exchange. The JetSend™ protocol allows the two devices to connect over a network, to negotiate a common data type for the information exchange, to provide device status, and to exchange the needed information, all without intervention from a user or from a third device such as a computer which provides oversight over the communication between the two devices. JetSend™ protocol is described at length in "HP JetSend Communications Technology, Section I: Architectural Overview; Section II: Protocol References; and Section III: E-Material Specification", Version 1.0, Hewlett Packard Co., 1997. These documents are incorporated by reference as if set forth in full herein.

One common example of information exchange is the exchange of image data between an image input device (such as a scanner or digital camera) and an image output device (such as a printer or facsimile or optical projector). According to currently-accepted information exchange negotiations, such as the JetSend™ negotiation, the image input device and the image output device jointly negotiate for a common data type for the image data, based on the image processing capabilities of the input and output devices, and thereafter exchange the image data in accordance with the negotiated data type. For example, in the case of an image data exchange between a color scanner and a monochrome printer, the scanner might include image processing capabilities so as to provide image data according to data formats that include full color image data and grayscale image data. The printer, on the other hand, might include image processing capabilities that allow it to accept full color image data, grayscale image data, and black-and-white image data, and thereafter to process such data so as to printout a monochrome image. For this contemplated information exchange, therefore, the most efficient data type for transfer of image data is grayscale image data, since it is commonly exportable and receivable by both the scanner and the printer, and since it results in the transmission of the least amount of data (and consequently the least amount of transmission time). Accordingly, for this information exchange, the scanner would scan in an image, convert the image into grayscale data, and transmit the grayscale data over the bi-directional communication interface to the printer; whereupon the printer would receive the grayscale image data from the bi-directional communication interface, convert the grayscale image data to monochrome image data, and print out the monochrome image data.

While such negotiations are advantageous in that they allow devices to negotiate a commonly-acceptable format for data transfer, improvements in efficiency are still needed. Specifically, because such negotiations fail to consider the relative processing power between the two devices, such negotiations often lead to a data transfer that is inefficient and time consuming.

SUMMARY OF THE INVENTION

It is an object of the invention to address the foregoing, by considering the relative processing capabilities between two devices involved in an information exchange on a bi-directional communication link, and by exchanging data processing functionality between the devices so as to take advantage of better performance on one device relative to that of another.

Accordingly, in one aspect, the invention is a negotiation for an exchange of image processing functionality between two devices communicating over a bi-directional communication link. The devices exchanges device class modules which include information concerning the relative processing power of the two devices, and thereafter exchange function code descriptions which include information concerning the functionality available in each device, together with information concerning whether such functionality is exportable to other devices. Thereafter, the two devices negotiate an assignment of functionality between the two devices, so as to effect an efficient image data transfer. As part of the negotiation, the devices determine whether an exchange of functionality is needed, and if such an exchange is needed, the devices transfer the functionality in the form of executable code. Data transfer is thereafter effected using the negotiated assignment of functionality between the two devices, including functionality that has been exported from one device to another.

In one preferred embodiment, negotiation of assignment of functionality involves a determination of alternative processing sequences for image data transfer. For example, image data transfer often involves the sequential application of individual image processing functions, such as functions to convert image data from one format to another, to compress and decompress the image data, to change the color depth (or to eliminate color), or to apply color correction functions. Thus, to negotiate an assignment of functionality to effect image data transfer, a determination is made of these various alternatives. A cost function is applied to each alternative, with the cost function considering cost in terms of data transfer time and image quality. The processing sequence with the lowest cost is then selected, with its attendant exchange of processing functionality from one device to another.

In further preferred aspects, it is possible for each of the two devices involved in the information exchange to refer to a third device on the bi-directional communication link, with the third device including a repository of image processing functionality. In this situation, the negotiation to assign functionality to effect image data transfer can proceed by additional functionality provided by the repository of image processing functions, so as to achieve and even further increase efficiency in image data transfer.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

The invention is applicable in any environment for which a two-way communication interface is available between two remote devices. Once such environment is a local or wide area network that connects devices having JetSend™ protocol. Accordingly, the invention is described herein in connection with the JetSend™ protocol, with the understanding that any two-way communication interface is equally usable.

Figure 1:
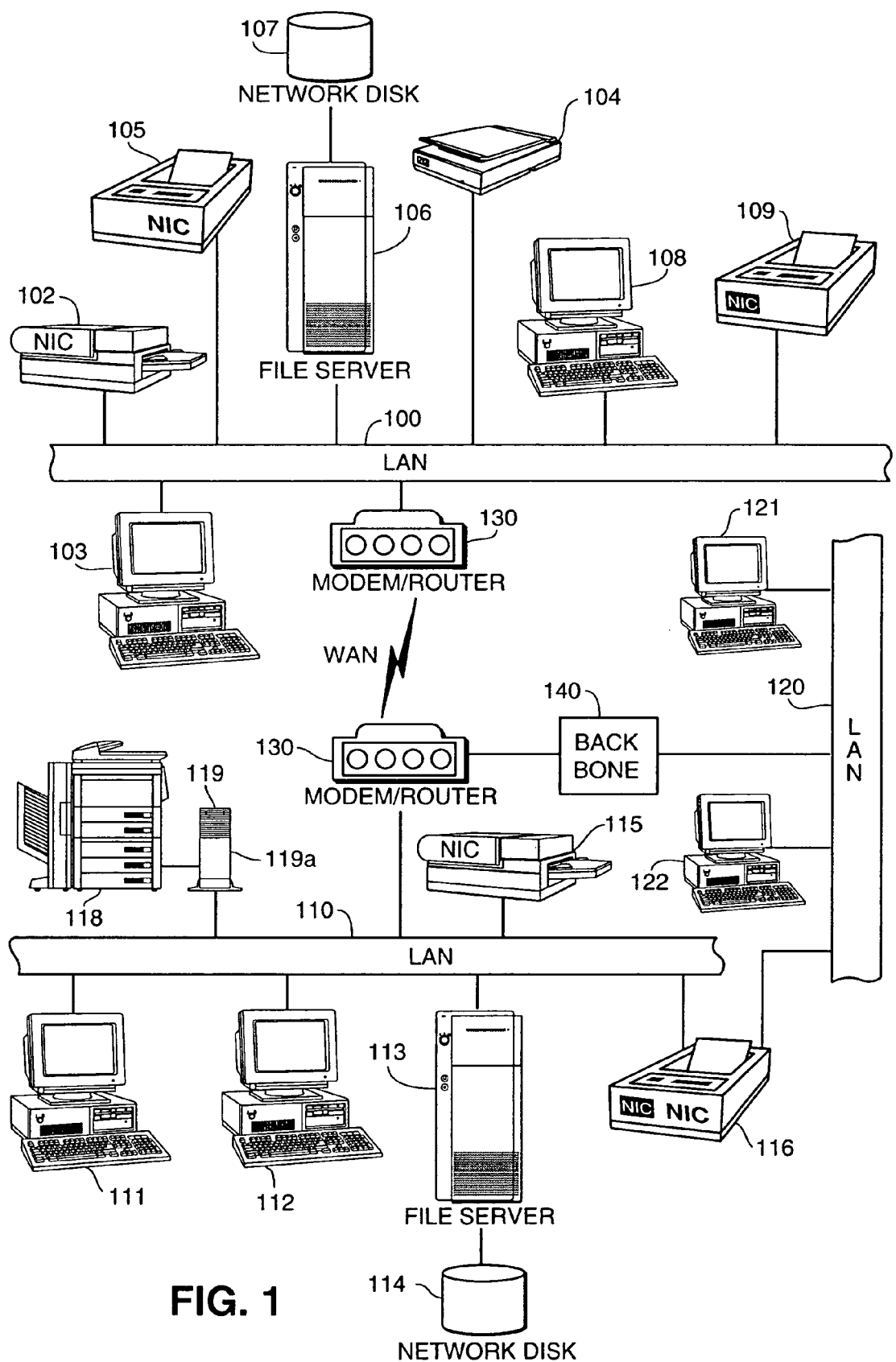
FIG. 1 is a topological view of a representative wide area network to which the present invention may be applied.

FIG. 1 is a topological view of a representative wide area network to which the present invention may be applied. Shown in FIG. 1 are three separate local area networks (LAN's) 100, 110 and 120, connected to each other through modems 130 and backbone 140 into an overall wide area network (WAN). Each of LAN's 100, 110 and 120 may be configured physically into any of the known network configurations such as Ethernet or Token Ring, and each LAN may carry network transmissions using one or more network protocols over one or more frame types. Because of the diversity of protocols and frame types, the wide area network of FIG. 1 is often referred to as a "heterogeneous" network.

For purposes of emphasis, it is further assumed that at least some of the LAN's are physically dissimilar; accordingly, in this representative embodiment, LAN's 100 and 110 are configured as Ethernet networks while LAN 120 is configured as a Token Ring network.

Connected to each of the LAN's are plural workstations and plural networked devices. For example, connected to LAN 100 are workstations 103 and 108, together with networked devices including printer 102, scanner 104, and printers 105 and 109. Also connected to LAN 100 is file server 106 which manages access to files stored on large capacity network disk 107. Other unshown networked devices and workstations may also be connected to LAN 100.

Connected to LAN 110 are workstations 111 and 112, and networked devices including printers 115 and 116 and multi-function (print, scan and fax) device 118. (Actually, multi-function device 118 is connected to LAN 110 through a network interface 119, as explained more fully below.) LAN 110 also includes file server 113 which manages access to large capacity network disk 114.

Connected to LAN 120 are workstations 121 and 122, as well as networked devices such as printer 116.

Each of the networked devices includes a network interface such as a network interface card ("NIC") or a stand-alone network interface. The function of the network interface is to provide an electrical and software interface to two-way communication on the network, specifically to receive and to send network transmissions to and from the networked device. For example, in the case of printer 102 which includes a NIC, the function of the NIC is to receive print jobs from LAN 100, such as a print job from a print queue in file server 106. Likewise, another function of the NIC for printer 102 is to send transmissions from printer 102 to LAN 100, such as transmissions which poll for the presence of print jobs in the print queue. Such transmissions of the network interface will hereinafter be referred to as "device-specific" transmissions, since they relate to the purpose of the networked device.

At least some of the devices on the WAN are JetSend™-enabled devices. For example, scanner 104 and printer 115 might be JetSend™-enabled, meaning that such devices can communicate directly over the WAN, without the intermediary of some other computing device such as one of the workstations, so as to cause an original document to be scanned in by scanner 104 and printed by printer 115. Other JetSend™-enabled devices, both input and output, are also possible, such as a JetSend™-enabled networked camera, a JetSend™-enabled networked whiteboard, a JetSend™-enabled networked facsimile, a JetSend™-enabled networked projector, a JetSend™-enabled networked workstation, and the like. JetSend™ communications between such devices will hereinafter be referred to as "JetSend™" transmissions.

Each networked device on the WAN includes some network interface. For example, printers 102, 105, 109 and 115 each include a single NIC. Scanner 104 includes a single NIC. Multi-function device 118 includes stand-alone network interface 119 which includes a multi-function controller 119a. JetSend™ software operates on the network interface.

Figure 2:
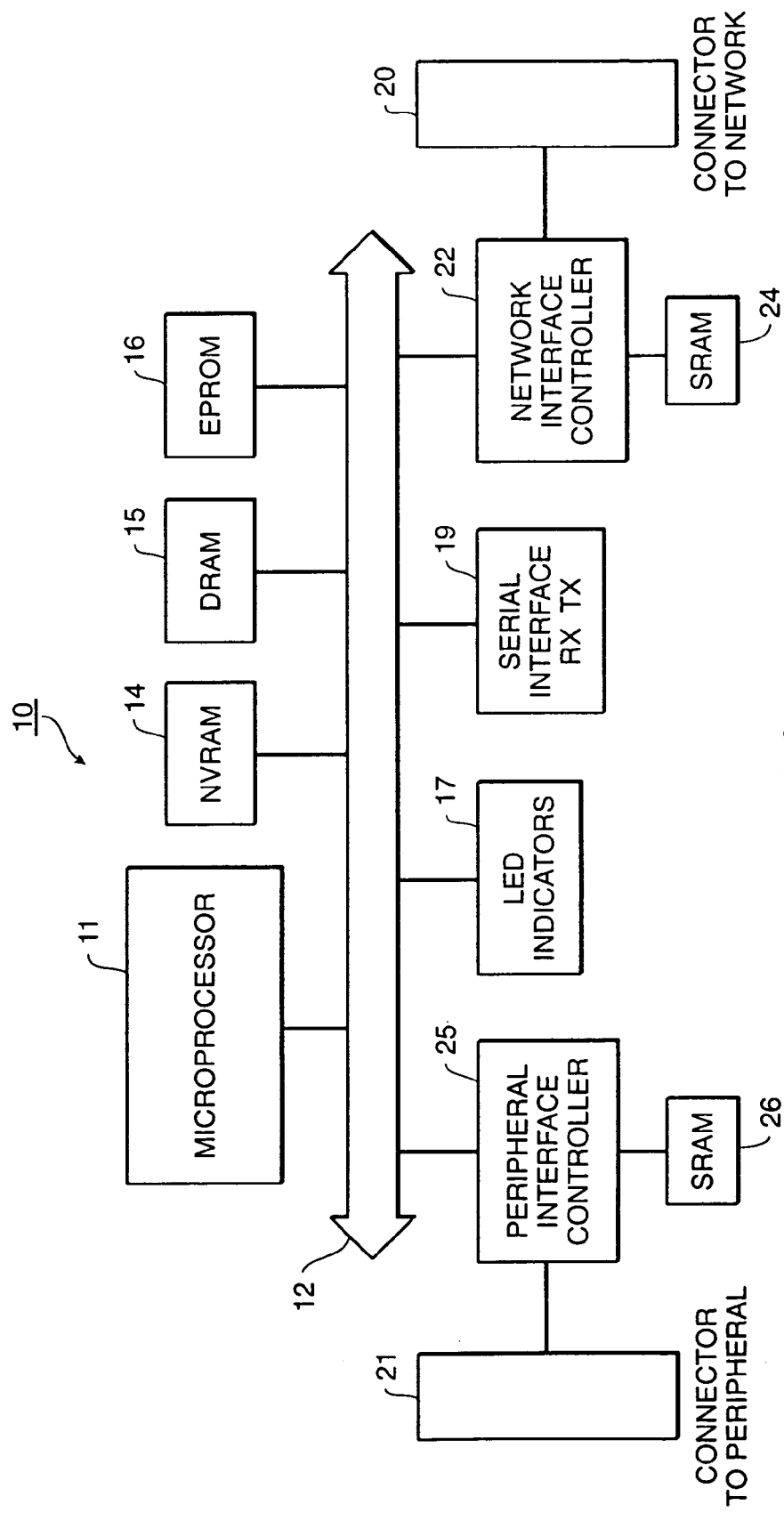
FIG. 2 is a block diagram of a representative network interface.

FIG. 2 is a block diagram of a representative network interface, such as a network interface card, for interfacing a networked device to a network. As shown in FIG. 2, the network interface includes central processing unit (CPU) 11 such as an Intel 80188 8-bit programmable microprocessor which is interfaced to computer bus 12. Also interfaced to computer bus 12 are non-volatile RAM (NVRAM) 14, dynamic RAM (DRAM) 15, electrically erasable programmable read only memory (EEPROM) 16, drivers for LED indicators 17, and serial interface 19 which includes both a transmit and a receive terminal. Configuration parameters and other important information concerning the configuration of the network interface are ordinarily stored in NVRAM 14, where such information may be stored between power cycles. Process steps for execution by microprocessor 11 are stored in EEPROM 16, but in general, before those process steps are executed, they are copied from EEPROM 16 into DRAM 15 for execution out of DRAM 15. LED indicators 17 are provided so as to give a user a general indication as to the processing status of the network interface, and may include, for example, indicator LEDs for power and data communication. Serial interface 19 is provided so as to allow local serial access to the network interface.

As mentioned previously, the interface is between the local area network and the networked device, and the network interface is therefore usually provided with a connector 20 for connecting to the LAN as well as a connector 21 for connecting to the networked device. On the network side, a network interface controller 22 is connected to bus 12 and to network connector 20, and provides hardware interface for capturing and assembling network transmissions received by the network interface and transmitted onto the LAN. Static RAM (SRAM) 24 is provided for network interface controller 22 so as to store, on a temporary basis, such network transmissions.

On the peripheral side, peripheral interface controller 25, which is connected to bus 12 and peripheral connector 21, provides peripheral interface between the network interface and the networked device serviced by the network interface. Peripheral controller 25 may be of any of a variety of different controllers, and can, for example, be constructed for a bi-directional interface (such as a SCSI interface, an IEEE 1284 interface, a dual port RAM interface, a shared RAM interface, and the like) or a uni-directional interface (such as a standard Centronix RS-232 interface or the like). Peripheral interface controller 25 is provided with SRAM 26 for temporary storage of data transmitted between the network interface and the networked device.

Software to implement a negotiation of an exchange of image processing functionality, according to the invention, is stored on and operates on the network interface card shown in FIG. 2, as described more fully below in connection with FIG. 3.

Figure 3:
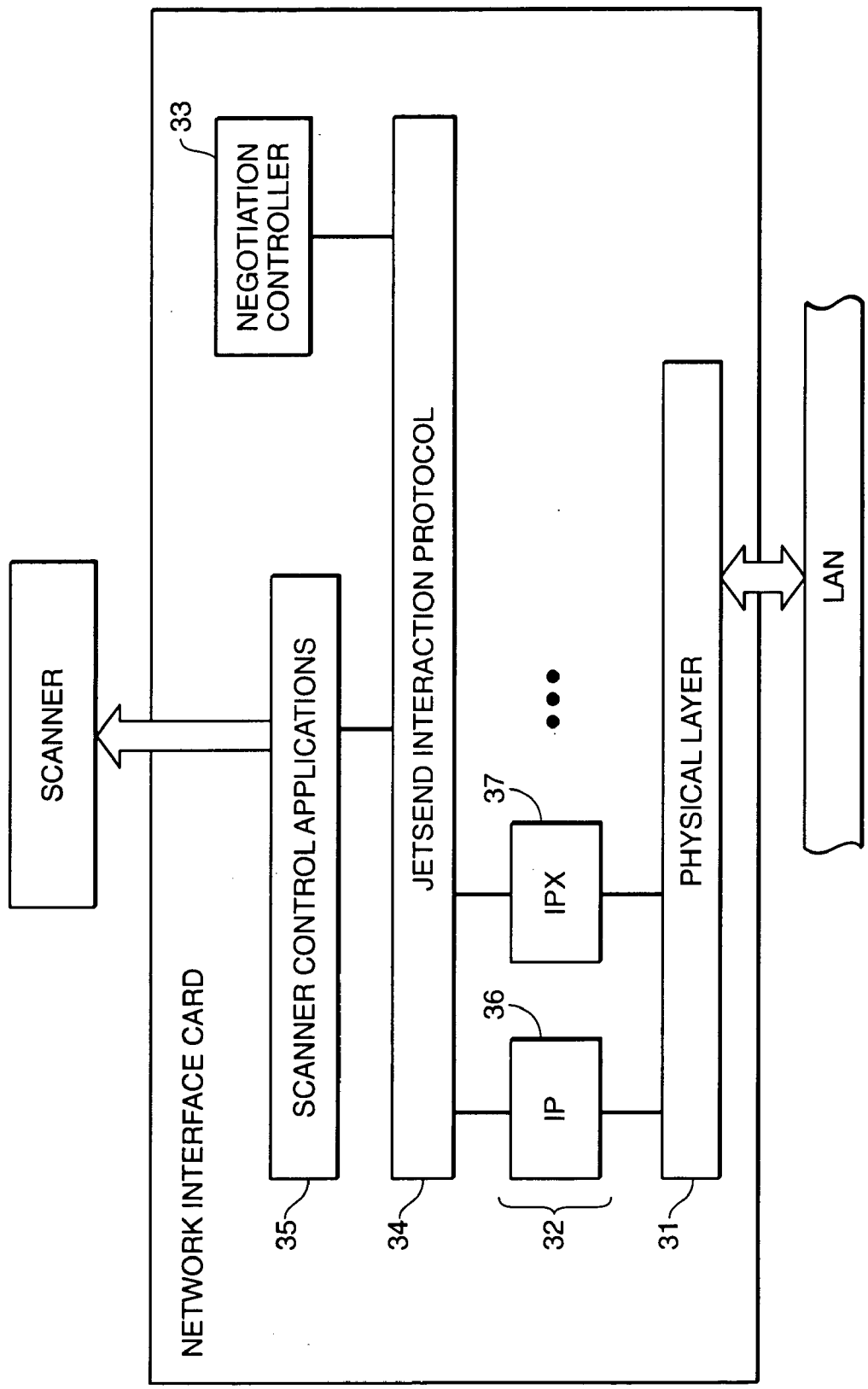
FIG. 3 illustrates the architecture of software in the network interface.

FIG. 3 illustrates the architecture of software for an image input device such as scanner 104, as stored in and executed by the NIC. Such software is stored as computer-executable process steps in a computer readable medium, such as the aforementioned EEPROM 16. As shown in FIG. 3, the architecture of the software extends through the NIC between the LAN and the networked input device, so as to provide interface for the networked device to the LAN. Thus, the architecture of the software includes physical layer 31, a plurality of different protocol stacks 32, a negotiation controller 33 according to the invention, JetSend™ interaction protocol 34, and device-specific applications such as scanner control application 35. Device-specific applications are applications concerning the functionality of the network device, such as the aforementioned scanner control application 35.

JetSend™ interaction protocol 34 provides for communication between JetSend T-enabled devices, and preferably is implemented using a number of layered protocols, with each protocol layer communicating with the corresponding layer in the other device. The layers preferably include interaction policies, interaction protocol, session protocol and reliable messaging protocol.

Plural protocol stacks 32 are preferred since they increase the flexibility of a networked device by allowing it to communicate via the network interface on the LAN using plural different network protocols. In the FIG. 3 example, two different network protocol stacks are shown, including IPX protocol stack 36 and IP protocol stack 37. Other protocol stacks may also be provided, such as a DDP protocol stack, a UDP protocol stack, a NetBIOS protocol stack, or an AppleTalk protocol stack. Of course, it is possible for a networked device to operate over even a single protocol stack.

Figure 4:
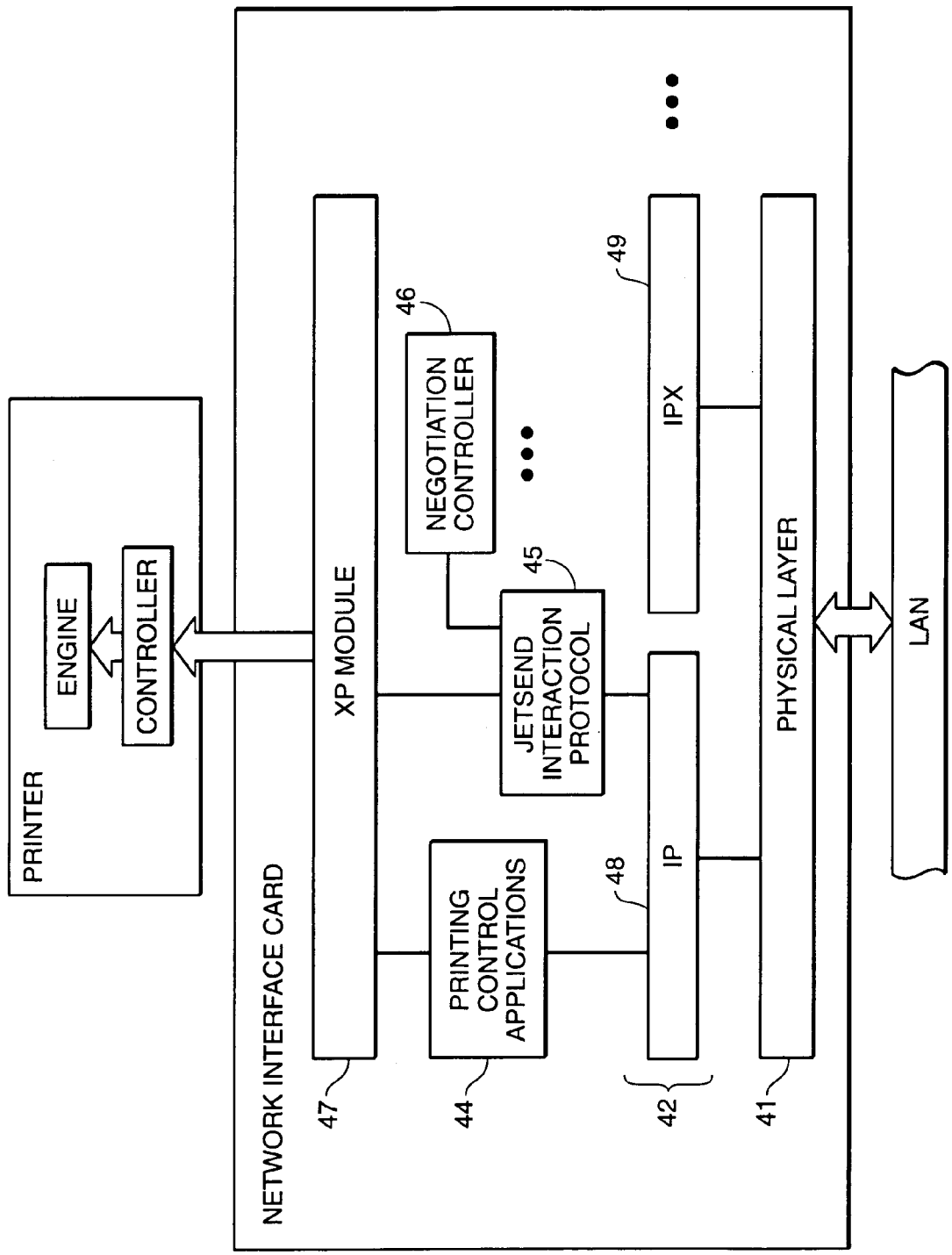
FIG. 4 illustrates the architecture of software for an image output device.

FIG. 4 illustrates the architecture of software for an image output device such as printer 115, as stored in and executed by the NIC for the printer. In much the same way as the software for image input devices, such software is stored as computer-executable process steps in a computer readable medium, such as in EPROM 16. As shown in FIG. 4, the architecture of the software extends through the NIC between the LAN and the networked output device, so as to provide interface for the networked device to the LAN. Thus, the architecture of the software in FIG. 4 includes physical layer 41, a plurality of different protocol stacks 42, device-specific applications such as printing control applications 44, a JetSend™ interface protocol 45, and a negotiation controller 46 according to the invention. The NIC further includes a printer interface module such as XP module 47. XP module 47 provides process steps for a standard interface between the NIC and the printer. In particular, and as illustrated in FIG. 4, the printer includes a print engine and a print controller, and XP module 47 interfaces directly to the print controller over whatever interface is provided therebetween, such as the aforementioned bi-directional interfaces or the aforementioned uni-directional interfaces.

In much the same way as plural protocol stacks increase the flexibility of a networked input device, plural protocol stacks 42 increase the flexibility of a networked output device such as the printer, by allowing the NIC to communicate via the network interface using plural different output protocols. Again, in FIG. 4, two different protocol stacks are shown including IP protocol stack 48 and IPX protocol stack 49. Other protocol stacks may also be provided; and it is further possible for the networked output device to operate over even a single protocol stack.

In the FIG. 4 example, printer control application 44, JetSend™ interaction protocol 45 and negotiation controller 46 are all shown as operating over the IP protocol stack 48. It is to be understood that this is representative only, and it is typical for printer control applications, JetSend™ interface protocols, and negotiation controllers also to operate over each of the different protocol stacks included in the NIC.

JetSend™ interaction protocol 45 is similar to but complementary to JetSend™ interaction protocol 34.

Figure 5:
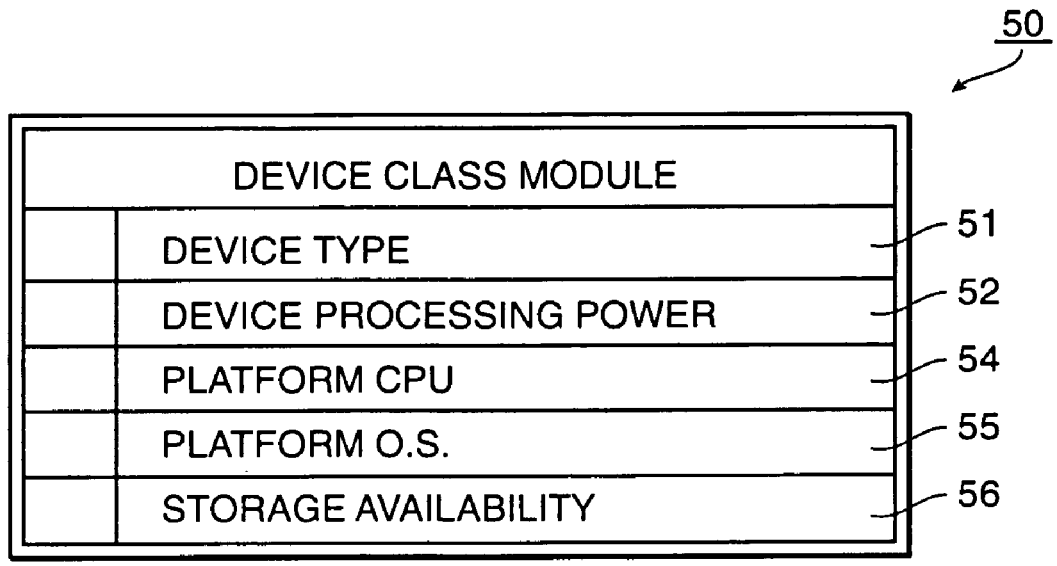
FIG. 5 illustrates the content of the device class module.
Figure 6:
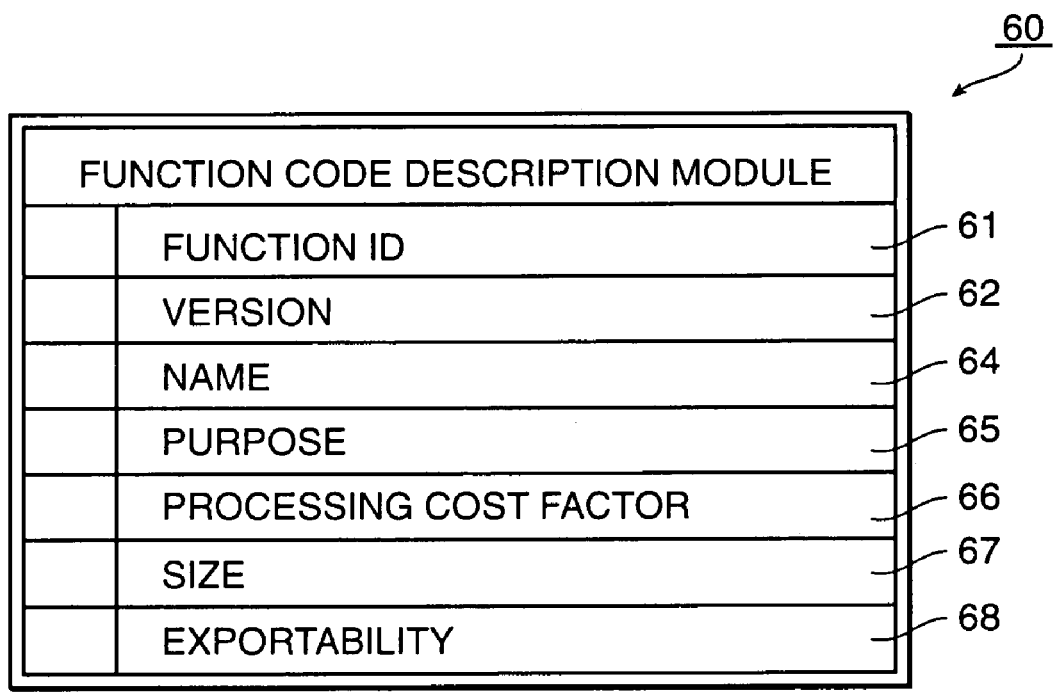
FIG. 6 illustrates the content of the function code description module.

Each of negotiation controllers 33 and 46 respectively stores two types of data modules that are exchanged during negotiation processing between two devices so as to determine whether or not image processing functionality of one device is transmitted to the other device for execution by that other device. The two data modules are a device class module and a function code description code. Ordinarily, only a single device class module is included for each different device; however, for function code description modules, many function code description modules are included in each device, corresponding to each of the different functions that the device performs. FIGS. 5 and 6 illustrate the content of the device class module and the function code description module.

As shown in FIG. 5, the device class module stores information concerning processing power of the device, as well as information identifying processor type. Thus, as shown in FIG. 5, device class module 50 includes fields respectively storing device type 51 (such as "scanner" or "printer"), device processing power 52 (such as a numeric value indicating relative processing capability of the device), platform CPU 54 (such as the specific manufacturer of microprocessor 11), platform operating system (such as various real-time operating systems like VxWorks or pSOS), and storage availability 56 (such as the total amount of storage available in DRAM 15 beyond that which is needed for default processing of the device).

As shown in FIG. 6, the function code description module includes information pertaining to each of the different functions that the device is capable of performing, as well as information concerning whether such functions are exportable to other devices together with information that can be used to determine whether exportability is desired. Thus, as shown in FIG. 6, function code description module 60 includes fields for a function identification 61 (such as compression or decompression capability, image conversion capability, color correction capability, and the like), version identifier 62 so as to identify the specific version of the function in question, a name field 64 which gives an alphanumeric reading of the function in question, a purpose field 65 which gives an alphanumeric explanation of the purpose of the function in question, a processing cost factor 66 (such as a numeric factor that indicates the relative processing complexity of the processing in question), a size field 67 which gives the amount of storage needed to execute the function in question, and an exportability field 68 which gives an indication as to whether or not the function in question is exportable to another device, as well as information as to whether or not the function in question is platform independent or platform dependent.

Figure 7:
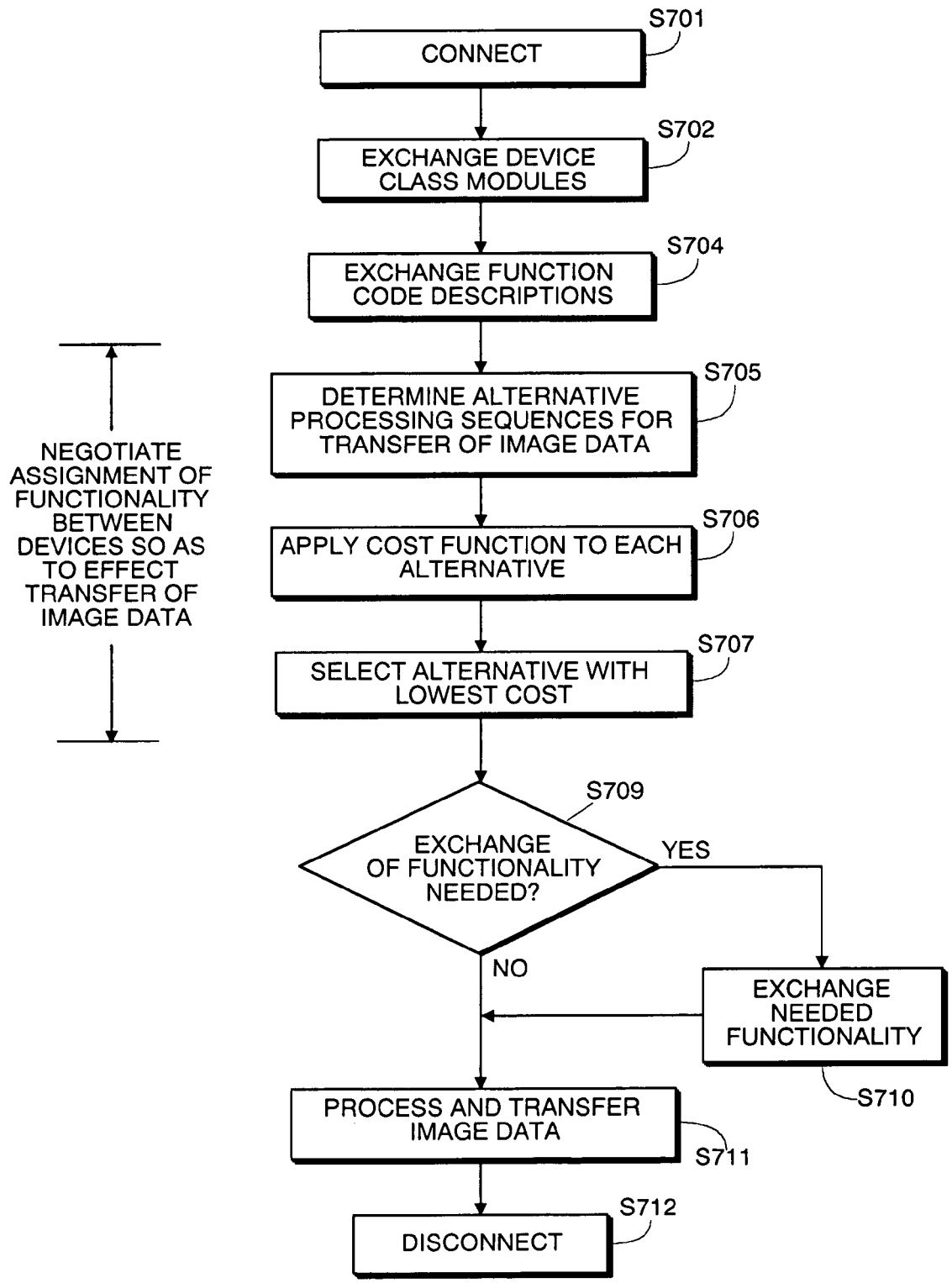
FIG. 7 is a flow diagram for explaining negotiation processing.

FIG. 7 is a flow diagram for explaining negotiation processing according to the invention, and specifically negotiation processing to determine whether or not image processing functionality should be exported from one device for execution on another device in connection with a transfer of image data between the two devices. The process steps shown in FIG. 7 are computer-executable process steps preferably stored on a computer readable medium, such as EEPROM 16 or DRAM 15. Briefly, according to FIG. 7, the process steps operate to exchange device information and exchange exportable function information between the two devices, to negotiate an assignment of functions between the two devices so as to effect a transfer of image data, to exchange exportable functions as needed, and to transfer image data according to the negotiated assignment of functions.

In more detail, in step S701, the first device and the second device connect over the bi-directional communication link and establish two-way communication with each other. Preferably, the devices are an image input device, such as a scanner or a digital camera, and an image output device, such as a printer or facsimile or overhead projector.

In step S702, the first and second devices exchange device class modules, thereby providing the other device with information concerning device capabilities and platform.

In step S704, the first and second devices exchange function code descriptions, thereby providing the other device with information concerning the available image processing functions as well as whether or not such image processing functions are exportable. Thus, the first device provides the second device with a function code description for each of its image processing functions including, for example, image processing functions such as color conversion functions, compression and decompression functions, color manipulation functions, and image conversion functions. The second device likewise provides the first device with a function code description for each of its image processing functions.

In steps S705 through S707, the first and second devices negotiate an assignment of functionality so as to effect the transfer of image data. Specifically, in steps S705 through S707, the first and second devices mutually determine various alternatives for image, processing functionality needed so as to transfer image data from the first device to the second device. This determination is made without regard to where specific image processing functionality might reside, and thus contemplates the overall image processing functionality needed to effect the data transfer. For each of the different alternatives, the devices apply a cost function so as to determine which alternative is the lowest cost. For example, the cost function might involve a simple determination of the quickest time to transfer the image data, or the cost function might involve a determination of which alternative provides the best image quality. It is also possible to provide a cost function which contemplates a tradeoff between image transfer time and image quality, such that a reasonably good image is transferred in the least amount of time.

In more detail, in step S705, the devices determine the various alternative processing sequences that are needed to effect a transfer of image data. For example, to transfer image data from a color scanner to a monochrome printer, one possible alternative to a processing sequence is to convert color data directly to monochrome data, to transfer the monochrome data to the printer, and to print the monochrome data at the printer. A different alternative processing sequence is to convert the color data to grayscale data to compress the grayscale data, to transmit the grayscale data to the printer, to decompress the grayscale data, to convert the decompressed grayscale data to monochrome data, and to print the monochrome data. Each of these different alternative processing sequences for a transfer of image data is developed by the devices in this step S705.

In step S706, a cost function is applied to each of the different alternatives that were determined in step S705. A generalized cost function, which contemplates a tradeoff between reasonably good image quality coupled with reasonably quick transfer time, is as follows:

Cost Function=(Time to transfer image processing functionality between devices)+(Time to execute image processing functionality in each device)+(Time to transfer data)+(Image quality factor).

The foregoing cost function is applied to each of the different alternatives determined in step S705.

In step S707, the image processing sequence with the lowest cost function is selected.

It should be noted that although these steps S705 through S707 ordinarily contemplate a determination of various alternative processing sequences by both the first and second devices, it is possible for these steps to be performed only in one device. In such a situation, it is ordinarily preferable for the processing steps to be performed in the sending device, for the reason that the sending device ordinarily has more information about the desires of the user in effecting the data transfer.

Step S709 determines whether an exchange of functionality is needed, based on the selected image processing sequence from step S707. Specifically, if the selected image processing sequence contemplates an exchange of image processing functionality from one device to another, then flow branches to step S710 to exchange the needed functionality. In any event, flow then advances to step S711 in which the image data is processed according to the selected processing sequence and transferred from the first device to the second device. In step S712, the devices disconnect.

Figure 8:
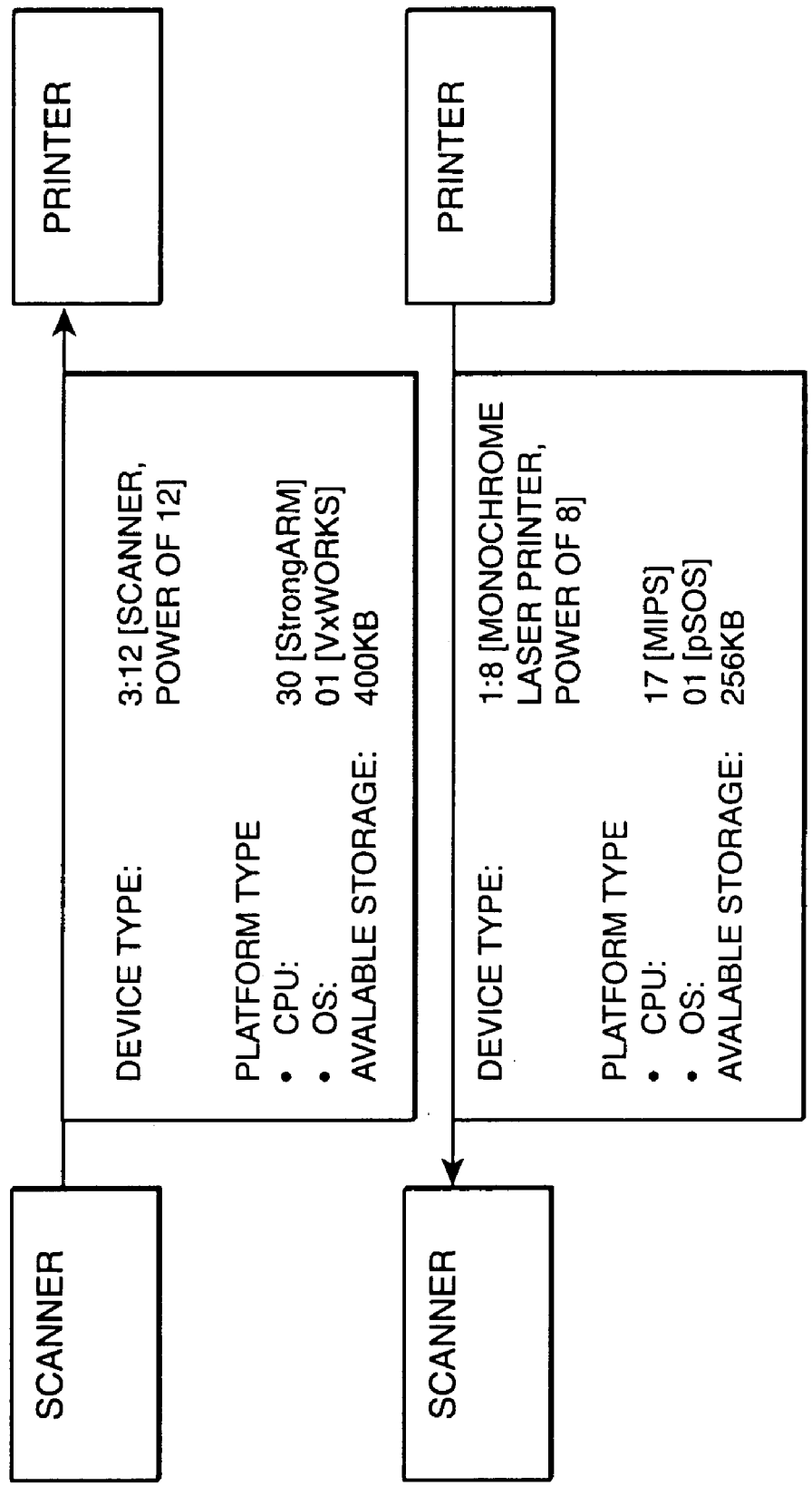
FIGS. 8, 9A and 9B are views for a detailed example of an exchange between a scanner and a printer.
Figure 9A:
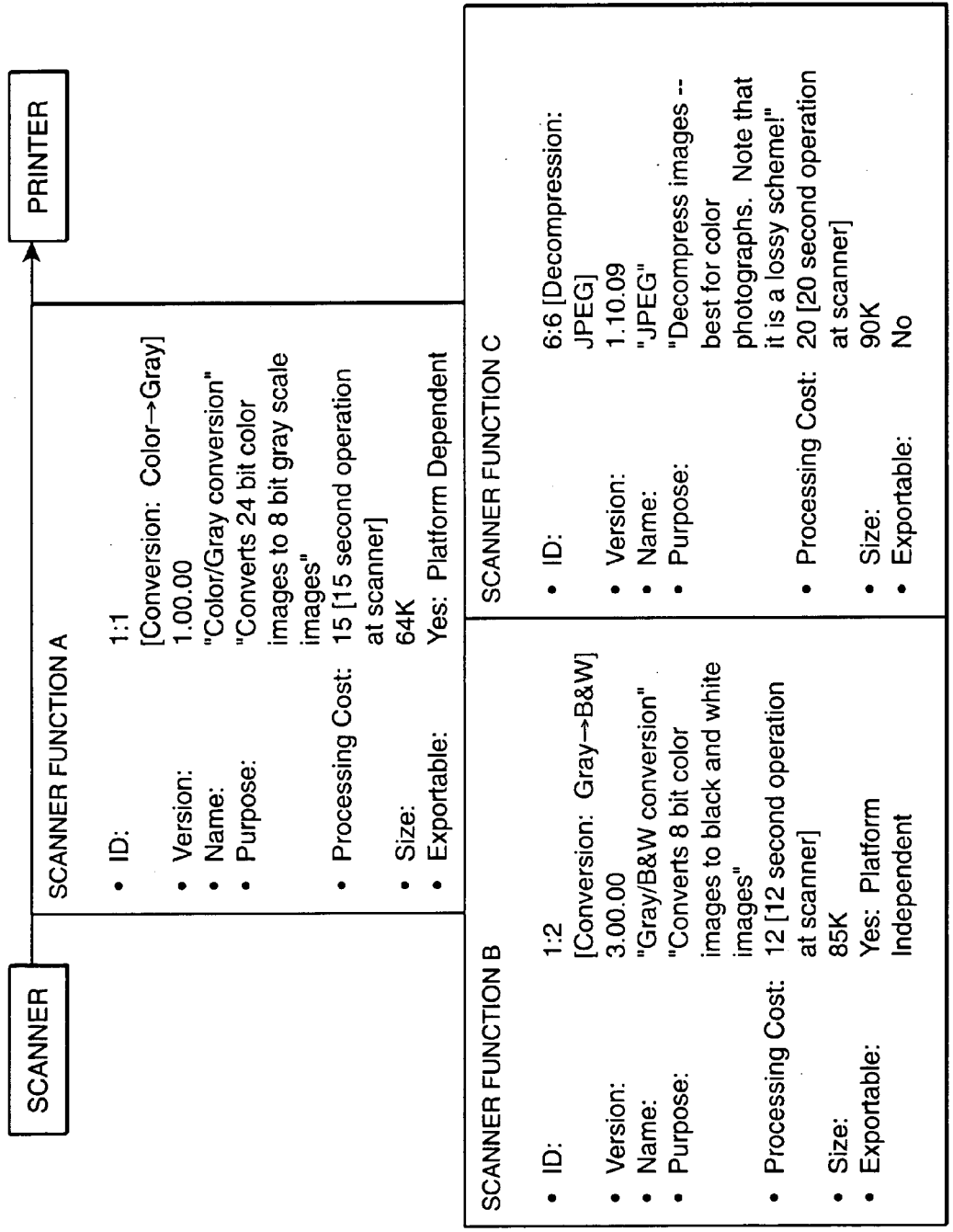
Figure 9B:
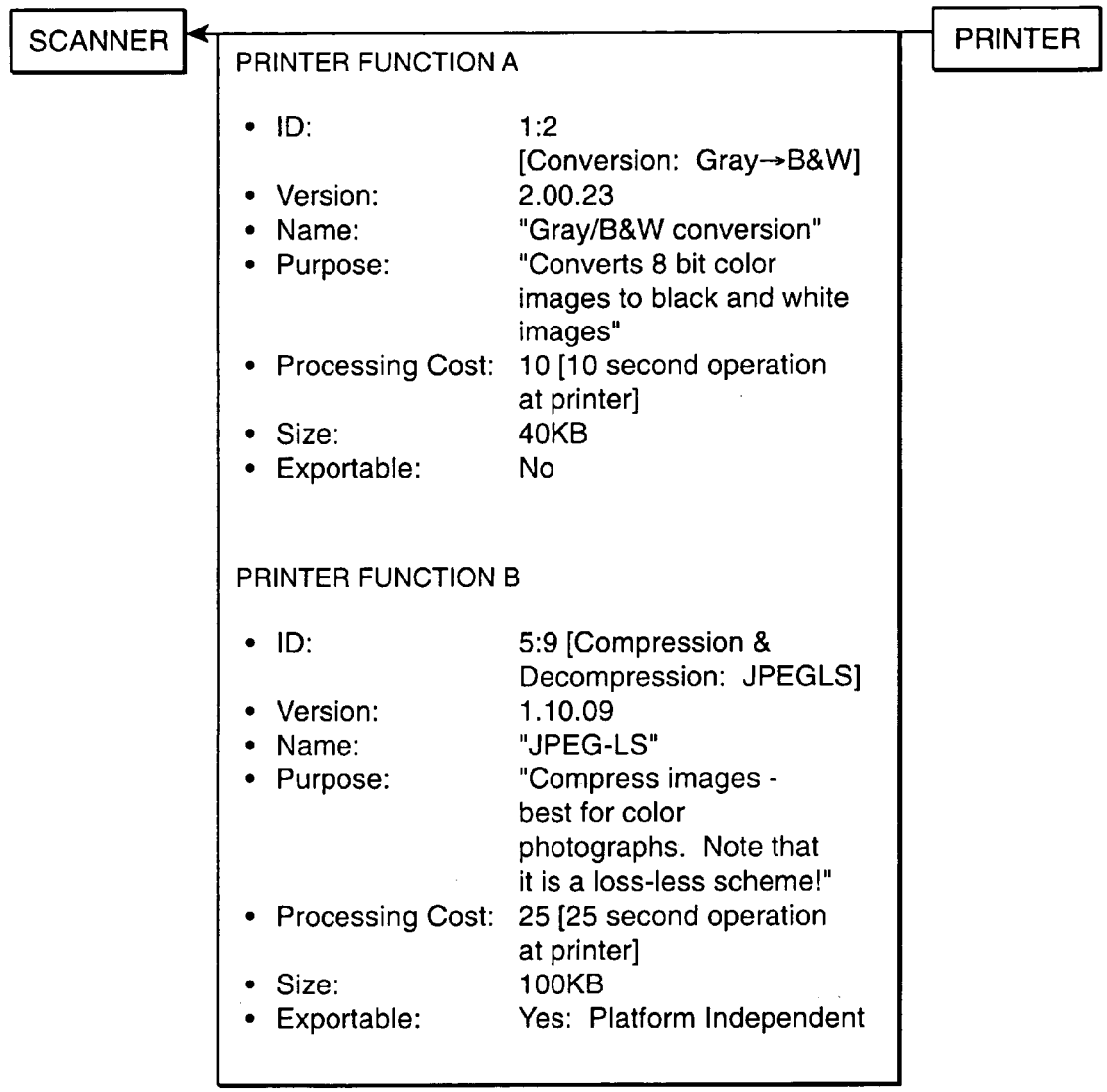

FIGS. 8, 9A and 9B are views for a detailed example of an exchange between a scanner and a printer. Thus, as shown in FIG. 8, following connection between the scanner and the printer (step S701), the scanner and the printer exchange device class modules (step S702). As shown in FIG. 8, the scanner sends its device class module indicating that it is a scanner, with a processing power factor of 12, a StrongARM processing unit, and VxWorks operating system. 400 Kb of memory is available in the scanner for processing capabilities beyond those ordinarily needed by the scanner itself.

Likewise, the device class module from the printer indicates that it is a monochrome laser printer with a processing power factor of 8, a MIPS microprocessor and a pSOS operating system. 256 Kb of storage is available on the printer for processing beyond the normal needs of the printer itself.

After exchanging device class modules, the printer and the scanner exchange function code descriptions. Function code descriptions for the scanner are illustrated in FIG. 9A, and indicate that the scanner has three functions: image conversion from 24-bit color to 8-bit grayscale; image conversion from 8-bit grayscale to black-and-white; and JPEG decompression. For image conversion from 24-bit color to 8-bit grayscale, the function code description indicates that the processing cost factor is 15, the size needed is 64 Kb, the function is exportable, and the function is platform dependent (meaning that it can execute only on a platform and operating system that is the same as that of the scanner which is VxWorks on a StrongARM CPU). Likewise, for image conversion for 8-bit grayscale to black-and-white, the function code description indicates that the processing cost factor is 12, the size is 85 Kb, the function is exportable, and it is platform independent (meaning that it can be executed on any operating system or any CPU). Platform independent code is ordinarily written in a platform independent language such as JAVA. Finally, for JPEG decompression, the function code description indicates that its processing cost factor is 20, its size is 90 Kb, and that it is not exportable.

FIG. 9B illustrates the function code descriptions provided by the printer to the scanner. As shown in FIG. 9B, the printer reports two functions: image conversion from 8-bit grayscale to black-and-white; and JPEG-LS compression and decompression. For image conversion from grayscale to black-and-white, the function code description indicates that its processing cost is 10, its size is 40 Kb, and it is not exportable. For JPEG-LS compression and decompression, the function code description indicates that its processing cost is 25, its size is 100 Kb, it is exportable and platform independent.

Following exchange of function code descriptions, the printer and the scanner then commence a negotiation of assignment of functionality so as to effect transfer of image data from the scanner to the printer (steps S705 through S707). In this case, the printer and the scanner (or the scanner alone, in the case where only one device makes the final selection of a processing sequence) immediately determine that JPEG-LS is the optimal compression choice for compression, since JPEG-LS is a lossless scheme employing a higher image quality than JPEG alone. Moreover, although its processing cost is high when executed in the printer (as indicated by the processing cost of 25 seconds at the printer power rating of 8), cost function analysis described below will indicate that its processing cost can be reduced to (25×8)/12= 16.66 if JPEG-LS is executed in the scanner, because of the scanner's higher processing power (here, 12). In addition, the scanner has sufficient available storage space (400 Kb) to house the JPEG-LS function.

In addition, in determining alternatives for processing sequences for image data transfer, since the printer is not capable of printing color, the image must be converted from 24-bit color to black-and-white data. However, the conversion from 24-bit color to black-and-white data need not be done in a single step, because the printer has image conversion capability from a 8-bit grayscale to black-and-white. Accordingly, it is possible for the scanner to covert from 24-bit color to 8-bit grayscale, and for the printer to convert from 8-bit grayscale to black-and-white.

Moreover, since the scanner is the more powerful device and already owns a function code to convert color from 24-bit color to 8-bit grayscale, there is no need to transfer the function code to the printer to perform such a conversion from 24-bit color to 8-bit grayscale. However, if the printer had been the more powerful device, negotiation may have resulted in a determination that the color conversion function codes should be transferred to the printer so that its superior processing power would increase the overall speed of image data transfer. This, of course, would have been weighed against the cost of transferring the original image as 24-bit color (which obviously is significantly higher than transferring the image as 8-bit grayscale data).

Conversely, if the scanner had not possessed a function code to conduct color conversion, but the printer did, a comparison similar to the above would most likely have resulted in a determination that the function code for color conversion should be transferred from the printer to the scanner, for execution there.

It is further noted that although both the printer and the scanner have function codes for conversion of grayscale images to black-and-white, the printer's version is older (version 3.00.00 as compared to version 2.00.23). If the image processing requirements for the current job would require it, and if such a transfer were included in the cost function, then transfer of the scanner's version to the printer would have been effected.

Overall, the cost function applied to this particular negotiation, and applied to each of the different processing alternatives, is as follows:

Cost function=(Time to transfer function and to install it)+(Time to transfer image data)+(Time to execute function codes at each of the printer and scanner).

In this particular example, and as indicated above, it is determined that the lowest cost processing alternative is an alternative where the scanner converts 24-bit color to grayscale data, compresses the grayscale data according to JPEG-LS compression that it obtains from the printer, and transfers the compressed grayscale data to the printer; whereafter the printer decompresses the compressed grayscale data, converts the decompressed grayscale data to black-and-white image data, and prints out the image. Accordingly, and in accordance with steps S709 and S710, the printer transfers its functionality for JPEG-LS compression to the scanner. Thereafter, the data transfer job is processed according to the agreed-upon image processing sequence, resulting in a scan at the scanner and a printout at the printer.

Figure 10:
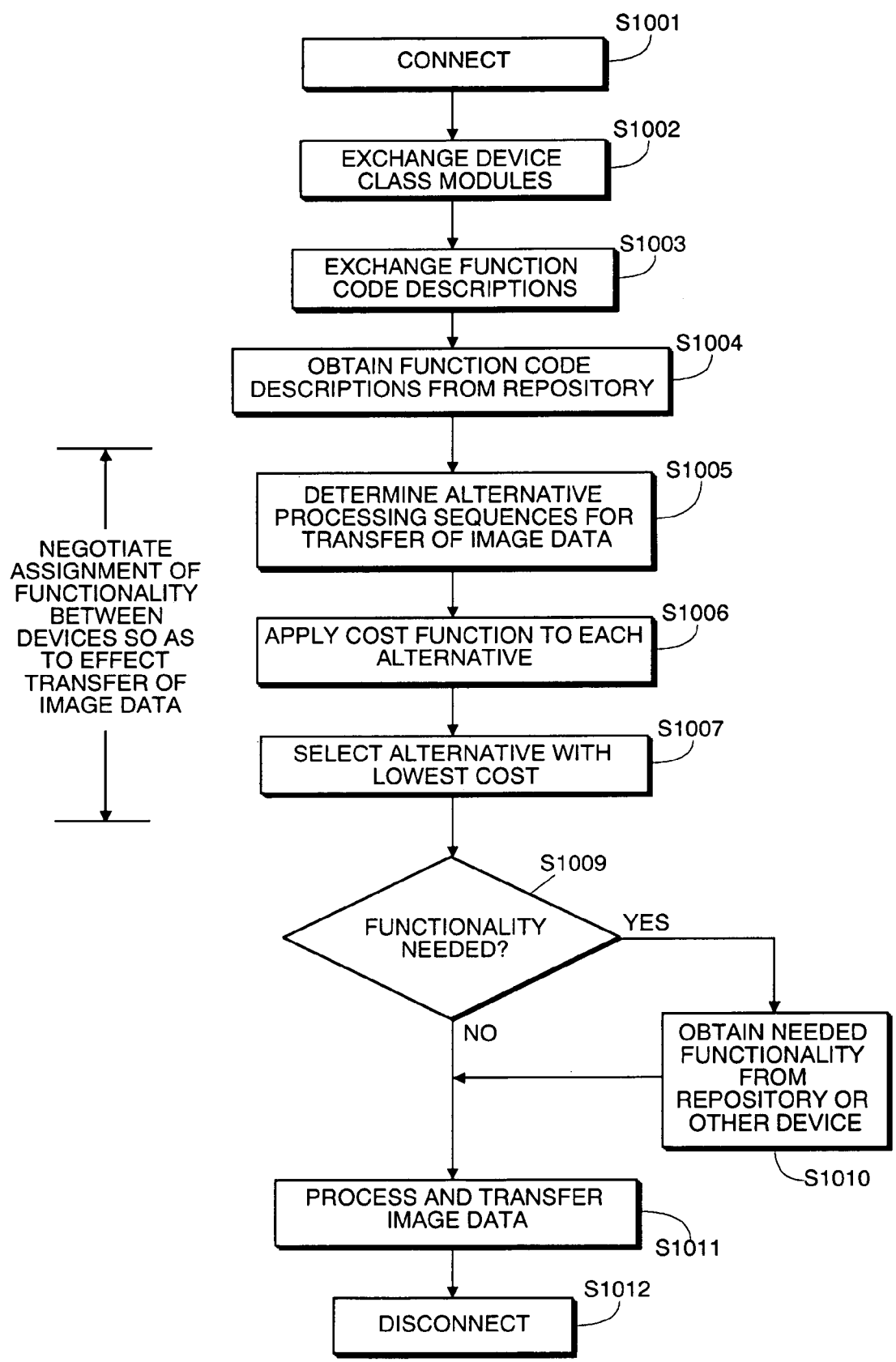
FIG. 10 is a flow diagram for explaining an alternative embodiment of the invention.

FIG. 10 is a flow diagram for a second embodiment of the invention. One way that the second embodiment differs from the first embodiment is that functionality need not be obtained only from the devices involved in the transfer of image data. Rather, functionality can also be obtained from a repository of functionality elsewhere on the network, such as from a file server or a computer workstation, or from another image processing device on the network that is not involved in the transfer of image data in question from the first device to the second device.

Thus, for example, and referring briefly to FIG. 1, in a situation where a transfer of image data is contemplated between scanner 104 and printer 116, it is possible to obtain image processing functionality from a repository on a third device, such as file server 106, workstation 121, or multi-function device 118.

Referring again to FIG. 10, in step S1001, the first and second devices connect and in steps S1002 and S1003 the devices exchange device class modules and function code descriptions. In step S1004, the first and second devices obtain function code descriptions from a repository or repositories of image processing functionality. Thereafter, in steps S1005 through S1007, the devices negotiate an assignment of functionality to effect the transfer of image data, this time considering both functionality present in the first and second devices, together with functionality present in the repository or repositories. Thus, in step S1005, the devices determine alternative processing sequences for the transfer of image data, in step S1006, the devices apply a cost function to each different alternative, and in step S1007, the devices select the processing alternative with the lowest cost function.

In step S1009, the devices determine whether functionality not currently present in the first and second devices is needed in order to process the image data according to the selected alternative. If functionality is needed, then flow branches to step S1010 in which the functionality is obtained from the other device, or from the repository of image processing functionality, as appropriate. Thereafter, flow branches to step S1011 to process the image data according to the agreed-upon processing alter-native, and to transfer the image data from the first device to the second device. After transfer, the devices disconnect in step S1012.

It should be noted that after transfer of functionality, in either of the first or second embodiments, it is possible for the device that received the functionality to retain it indefinitely. Thus, following receipt of a function, the device can store it in DRAM 16 for use in subsequent image processing jobs, including for use in exporting the functionality to other devices in subsequent image data transfers.

Moreover, although it is preferred for the transfer of image data to act as a trigger for the first and second devices to go out and to obtain needed image processing functionality, it is possible for the devices to communicate continuously in the background, over the bi-directional communication link so as to locate and obtain image processing functionality that might be needed in future image data transfers. For example, in a situation where a newer version of some image processing functionality becomes available at a repository of image processing functionality, it is possible according to the invention for the device to communicate with the repository so as to obtain the updated function, so as to have the updated function available for use in subsequent image data transfers.

It is emphasized that several changes may be applied on the above-described system without departing from the teaching of the invention. It is intended that all the matter contained in the present disclosure, or shown in the accompanying drawings, shall be interpreted as illustrative rather than limiting.

What is claimed is:

1. A method for negotiating an exchange of image processing functionality between first and second devices over a bi-directional communication link, comprising the steps of:

communicating a function description between the first and second devices, the function description including information concerning functionality available in the first or second devices;

negotiating between the first and second devices to assign image processing functionality to the first or second device in accordance with the functionality available in the first or second device, wherein the assigned image processing functionality effects an image transfer between the first and second devices; and transmitting from one of the first and second devices to the other of the first and second devices, in accordance with the assignment of the image processing functionality, program code that implements functionality assigned to the other of the devices and needed by the other of the devices, wherein both the first and second devices can execute the program code to perform the image processing functionality and the program code is executed by the other of the devices in accordance with the transmission of the program code from the one device to the other device.

2. A method according to claim 1, further comprising the step of transferring image data from the first device to the second device using the negotiated assignment of functionality, including functionality that has been exported from one device to the other.

3. A method according to claim 1, further comprising the step of obtaining function code descriptions for functionality in a repository of image processing functionality, wherein said step of negotiating to assign functionality includes the step of negotiating in respect of the image processing functionality exported from the repository, and wherein said step of transmitting functionality includes the step of transmitting functionality from the repository.

4. A method according to claim 1, wherein said first and second devices retain transmitted functionality for use in connection with subsequent image processing jobs.

5. A method according to claim 1, wherein said step of communicating includes the steps of:

transferring the function description from one of the first and second devices to the other of the first and second devices; and transferring the function description from the other of the first and second devices to the one of the first and second devices.

6. A method according to claim 1, wherein negotiating an assignment of image processing functionality is based on a cost analysis, which is based at least in part on a cost of transferring the program code that implements image processing functionality between the first and second devices.

7. The method of claim 1, wherein prior to the transmission of the program code, the device to which the program code is transmitted lacks the image processing functionality implemented by the program code.

8. A method for negotiating an exchange of image processing functionality between first and second devices over a bi-directional communication link, comprising the steps of:

communicating a function description between the first and second devices, the function description including information concerning functionality available in the first or second devices;

negotiating between the first and second devices to assign image processing functionality to the first or second device in accordance with the functionality available in the first or second device, wherein the assigned image processing functionality effects an image transfer between the first and second devices; and transferring from one of the first and second devices to the other of the first and second devices, in accordance with the functionality assigned to the other of the devices and needed by the other of the devices, wherein the program code is executed by the other of the devices, wherein said step of negotiating an assignment of functionality includes the steps of:

determining alternative processing sequences for image data transfer;

applying a cost function to each alternative; and selecting the alternative with the lowest cost function.

9. A method according to claim 8, wherein said cost function contemplates both image transfer time and image quality.

10. A network interface card for interfacing between a network and an image processing apparatus, the network interface card comprising:

a communicator adapted to communicate a function description with an external device, the function description including information concerning functionality available in the image processing apparatus or the external device;

a negotiator adapted to negotiate between the image processing apparatus and the external device to assign image processing functionality to the image processing apparatus or the external device in accordance with the functionality available in the image processing apparatus or the external device, wherein the assigned image processing functionality effects an image transfer between the image processing apparatus and the external device; and a program code communicator adapted to communicate between the image processing apparatus and the external device, in accordance with the assignment of the image processing functionality, program code that implements image processing functionality assigned to and needed by one of the image processing apparatus and the external device, wherein both the first and second devices can execute the program code to perform the image processing functionality and the program code is executed by the one of the image processing apparatus and the external device in accordance with the transmission of the program code from the one device to the other device.

11. A network interface card according to claim 10, wherein the negotiator is adapted to negotiate an assignment of image processing functionality based on a cost analysis, which is based at least in part on a cost of transferring the program code that implements image processing functionality to the external device.

12. An image processing apparatus comprising:

a communicator adapted to communicate a function description with the external device, the function description including information concerning image processing functionality available in the image processing apparatus or the external device;

a negotiator adapted to negotiate between the image processing apparatus and the external device to assign image processing functionality to the image processing apparatus or the external device in accordance with the functionality available in the image processing apparatus or the external device, wherein the assigned image processing functionality effects an image transfer between the image processing apparatus and the external device; and a program code communicator adapted to communicate between the image processsing apparatus and the external device, in accordance with the assignment of the image processing functionality, program code that implements image processing functionality assigned to and needed by one of the image processing apparatus and the external device, wherein both the first and second devices can execute the program code to perform the image processing functionality and the program code is executed by the one of the image processing apparatus and the external device in accordance with the transmission of the program code from the one device to the other device.

13. An image processing apparatus according to claim 12, further comprising an image data transmitter adapted to transmit image data to the external device based on the negotiated assignment of functionality.

14. An image processing apparatus according to claim 12, further comprising a receiver adapted to receive program code that implements image processing functionality from the external device in case that the negotiation indicates that functionality is needed in the image processing apparatus.

15. An image processing apparatus according to claim 12, wherein the negotiator is adapted to negotiate an assignment of image processing functionality based on a cost analysis, which is based at least in part on a cost of transferring the program code that implements image processing functionality to the external device.

16. A network interface card for interfacing between a network and image processing apparatus, the network interface card comprising:

a communicator adapted to communicate a function description with an external device, the function description including information concerning functionality available in the image processing apparatus or the external device; and a negotiator adapted to negotiate between the image processing apparatus and the external device to assign image processing functionality to the image processing apparatus or the external device in accordance with the functionality available in the image processing apparatus or the external device, wherein the assigned image processing functionality effects and image transfer between the image processing apparatus and the external device; and a receiver adapted to receive from the external device, in accordance with the assignment of the image processing functionality, program code that implements image processing functionality assigned to and needed by the image processing apparatus, wherein both the first and second devices can execute the program code to perform the image processing functionality and the program code is executed by the image processing apparatus in accordance with the transmission of the program code from the one device to the other device.

17. A network interface card according to claim 16, wherein the negotiator is adapted to negotiate an assignment of image processing functionality based on a cost analysis, which is based at least in part on a cost of transferring the program code that implements image processing functionality to from external device.

18. An image processing apparatus comprising:

a communicator adapted to communicate a function description with an external device, the function description including information concerning functionality available in the image processing apparatus or the external device; and a negotiator adapted to negotiate between the image processing apparatus and the external device to assign image processing functionality to the image processing apparatus or the external device in accordance with the functionality available in the image processing apparatus or the external device, wherein the assigned image processing functionality effects an image transfer between the image processing apparatus and the external device; and a receiver adapted to receive from the external device, in accordance with the assignment of image processing functionality, program code that implements image processing functionality assigned to and needed by the image processing apparatus, wherein both the first and second devices can execute the program code to perform the image processing functionality and the program code is executed by the image processing apparatus in accordance with the transmission of the program code from the one device to the other device.

19. An image processing apparatus according to claim 18, wherein the negotiator is adapted to negotiate an assignment of image processing functionality based on a cost analysis, which is based at least in part on a cost of transferring the program code that implements image processing functionality from the external device.

20. A method for negotiating an exchange of image processing functionality between first and second devices over a bi-directional communication link comprising the steps of;

communicating a function description between the first and second devices, the function description including information concerning functionality available in the first or second devices;

negotiating between the first and second devices to assign image processing functionality to the first or second device in accordance with the functionality in the first or second device, wherein the assigned image processing functionality effects an image transfer between the first and second devices; and transferring from one of the first and second devices to the other of the first and second devices, in accordance with the assignment of the image processing functionality, program code that implements functionality assigned to the other of the devices and needed by the other of the devices, wherein the program code is executed by the other of the devices, wherein at the time of negotiating between the first and second device, the device to which the program code is transferred in the transferring step is unable to perform the image processing functionality implemented by the program code transferred in the transferring step.

21. A network interface card for interfacing between an image processing device and a local area network, said network interface card including:

a network protocol stack for interfacing between the local area network and the network interface card, and for receiving network communications directed to the image processing device;

a device-specific application layer that provides device-specific image processing functionality for driving the image processing device, the device-specific application layer receiving network communications directed to the device from the protocol stack; and a negotiation controller for negotiating an exchange of image processing functionality with another device on the local area network, the negotiation controller being programmed with process steps according to the method of any one of claims 1 to 9 and 20.

22. Computer-executable process steps stored on a computer readable storage medium, the computer executable process steps for negotiating an exchange of image processing functionality between first and second devices over a bi-directional communication link, said computer executable process steps including steps according to any one of claims 1 to 9 and 20.

23. A storage medium for storing computer executable process steps to effects negotiation of an exchange of image processing functionality between first and second devices over a bi-directional communication link, said process steps including steps according to any one of claims 1 to 9 and 20.

* * * * *

UNITED STATES PATENT AND TRADEMARK OFFICE
CERTIFICATE OF CORRECTION

PATENT NO. : 6,947,994 B1
DATED : September 20, 2005
INVENTOR(S) : Andrew J. Kraslavsky It is certified that error appears in the above-identified patent and that said Letters Patent is hereby corrected as shown below:

Column 5,
Line 48, "JetSend T-enabled" should read -- JetSend$^{TM}$-enabled --.

Column 11,
Line 28, "alter-native" should read -- alternative --.

Column 12,
Line 67, "the functionality" should read -- the assignment of the image processing functionality, program code that implements functionality --.

Column 14,
Line 38, "and" should read -- an --; and
Line 56, "from" should read -- the --.

Signed and Sealed this

Seventh Day of February, 2006

JON W. DUDAS
*Director of the United States Patent and Trademark Office*